United States Patent [19]

Krantz

[11] Patent Number: 5,213,059
[45] Date of Patent: May 25, 1993

[54] AIR CONDITIONING UNIT FOR EXPERIMENTAL ANIMALS

[75] Inventor: Anders Krantz, Söderala, Sweden

[73] Assignee: Airchitecht I Soderhamn AB, Soderhamn, Sweden

[21] Appl. No.: 768,559

[22] PCT Filed: Mar. 22, 1990

[86] PCT No.: PCT/SE90/00185
  § 371 Date: Nov. 14, 1991
  § 102(e) Date: Nov. 14, 1991

[87] PCT Pub. No.: WO90/11009
  PCT Pub. Date: Oct. 4, 1990

[30] Foreign Application Priority Data

Mar. 29, 1989 [SE] Sweden .................................. 8901090
Nov. 9, 1989 [SE] Sweden .................................. 8903757

[51] Int. Cl.⁵ .............................................. A01K 1/00
[52] U.S. Cl. ....................................... 119/15; 454/193; 454/57

[58] Field of Search ................. 62/237, 255, 256, 404, 62/413, 414; 454/49, 56, 66, 189, 188, 193; 119/15, 17, 39

[56] References Cited

U.S. PATENT DOCUMENTS 3,924,571 12/1975 Holman ................................ 119/15
4,550,650 11/1985 Denner et al. ........................ 454/57

Primary Examiner—John Sollecito
Attorney, Agent, or Firm—McFadden, Fincham, Marcus & Anissimoff

[57] ABSTRACT

An air conditioning unit comprises a housing (1) which consists of a bottom (2), a roof (3), two side walls (4, 4'), a rear wall (5), and a front wall (6) having an opening (8) which is closeable by means of at least one door (7, 7') and which permits access to the interior of the housing; means for introducing supply air into the housing; and means for evacuating exhaust air therefrom. Two vertical air ducts (13, 13') provided adjacent to the front wall (6) have a large number of small holes (14) through which supply air can be introduced into the housing in the form of partial currents which are directed away from the front wall (6) towards the rear wall (5), both when the door (7, 7') is closed and when it is open.

8 Claims, 4 Drawing Sheets

AIR CONDITIONING UNIT FOR EXPERIMENTAL ANIMALS

FIELD OF THE INVENTION

The present invention relates to an air conditioning unit for experimental animals, which comprises a housing with a bottom, a roof, two side walls, a rear wall, and a front wall having an opening which is closeable by means of at least one door and which permits access to the interior of the housing; one or more supporting means, e.g. shelves, forming two or more compartments each adapted to accommodate a number of cages with experimental animals; and means for conducting air through said compartments, more precisely in horizontal air currents which are taken into the housing in the form of supply air via inlet holes in one of said walls and which are sucked out in the form of exhaust air via outlet holes in an opposing wall.

DESCRIPTION OF THE PRIOR ART

Various types of air conditioning units are widely used in connection with animal experiments, and in some cases the experimental animals are for a long time kept in an atmosphere which, in respect of purity, temperature, atmospheric humidity, toxicity etc., is highly exact and homogeneous for different animals.

In one type of unit which has previously been used in animal experiments, the supply air is conducted to the interior of the housing via coarse filters in the roof of said housing, and the exhaust air which has passed through the interior of the housing is evacuated via means adjacent to the bottom of said housing. The air current through said housing is, in other words, chiefly vertically directed. In actual practice, this means that the animals in the bottom compartment of the housing are kept in an atmosphere which may differ radically from that in the top compartment. Thus, the supply air taken in adjacent to the top compartment is pure and has a temperature and a humidity which can easily be adjusted in advance, but as the air passes the successive shelves and the animals kept in cages thereon, it will be exposed to the humidity from both the animals and their feed, additional heat supplied by the body heat of the animals, dust and fibre particles from both the animals and their feed, and infectious matter present inside the housing whether intentional or no. Consequently, the animals in the bottom compartment are kept in an atmosphere that has a temperature and a humidity which are considerably higher than in the atmosphere in the top compartment. Naturally enough, the air in the bottom compartment is far more contaminated than the air in the top compartment.

In another unit known from U.S. Pat. No. 4,305,347, the air is, to be sure, conducted in horizontal currents through the different compartments in the housing, but these currents are directed from one side wall to the other, opposing side wall. More precisely, the supply air is taken in via diffusion screens and a perforated metal sheet forming one side wall of said housing, the exhaust air being sucked out via a perforated metal sheet forming the opposing side wall, and diffusion screens associated therewith. However, also this unit is unable to solve, in satisfactory manner, the problem of an inhomogeneous atmosphere for different animals. In actual laboratory practice, the cages containing the animals are thus put on the shelves side by side in varying numbers, which means that the atmosphere in the cage closest to the side wall through which the supply air is taken in will have a different and lower temperature, humidity, degree of contamination, and toxicity than the atmosphere in the cage which is located at the opposing side wall in the same compartment. Another serious inconvenience impairing the unit of U.S. Pat. No. 4,305,347 is that the impure and frequently infected air slowly flowing through the interior of the housing when the door is closed, may without hindrance escape through the access opening to the housing when the door is opened, e.g. for inspection, feeding, the taking of specimens, etc. Thus, the exposure hazard to the people conducting the experiments is considerable.

SUMMARY OF THE INVENTION

The present invention aims at obviating the above inconveniences of the air conditioning unit according to U.S. Pat. No. 4,305,347 and at providing a unit which, in a simple and expedient manner, ensures substantially homogeneous conditions for all of the experimental animals. The invention also aims at ensuring that the air inside the housing does not escape through the access opening when the door is opened. According to the distinctive features of the invention, these objects are achieved in that the inlet holes for the supply air are formed in two vertical air ducts which both are disposed immediately adjacent to the opening in the housing and which have opposing surfaces in which said inlet holes are formed for conducting the supply air into the housing in the form of opposing and discrete partial currents which, after having met in an area between the air ducts, are deflected towards the housing rear wall which has the outlet holes for sucking out the exhaust air, such that the air currents passing through the separate compartments are at all times directed away from the front wall and towards the rear wall, whether the door is closed or no.

In a preferred embodiment of the invention, at least one filter for cleaning the supply air before this is introduced into the housing is provided between an inlet for the supply air and said vertical air ducts. Also, one or more filters with a total air throughflow capacity higher than that of the supply air filter are provided between the outlet holes in the rear wall and an outlet for final evacuation of the exhaust air from said unit, thereby to achieve, when the door is opened, an increased air flow through the housing, compared with the air flowing through when said door is shut.

DESCRIPTION OF THE PREFERRED EMBODIMENTS

Figure 1:
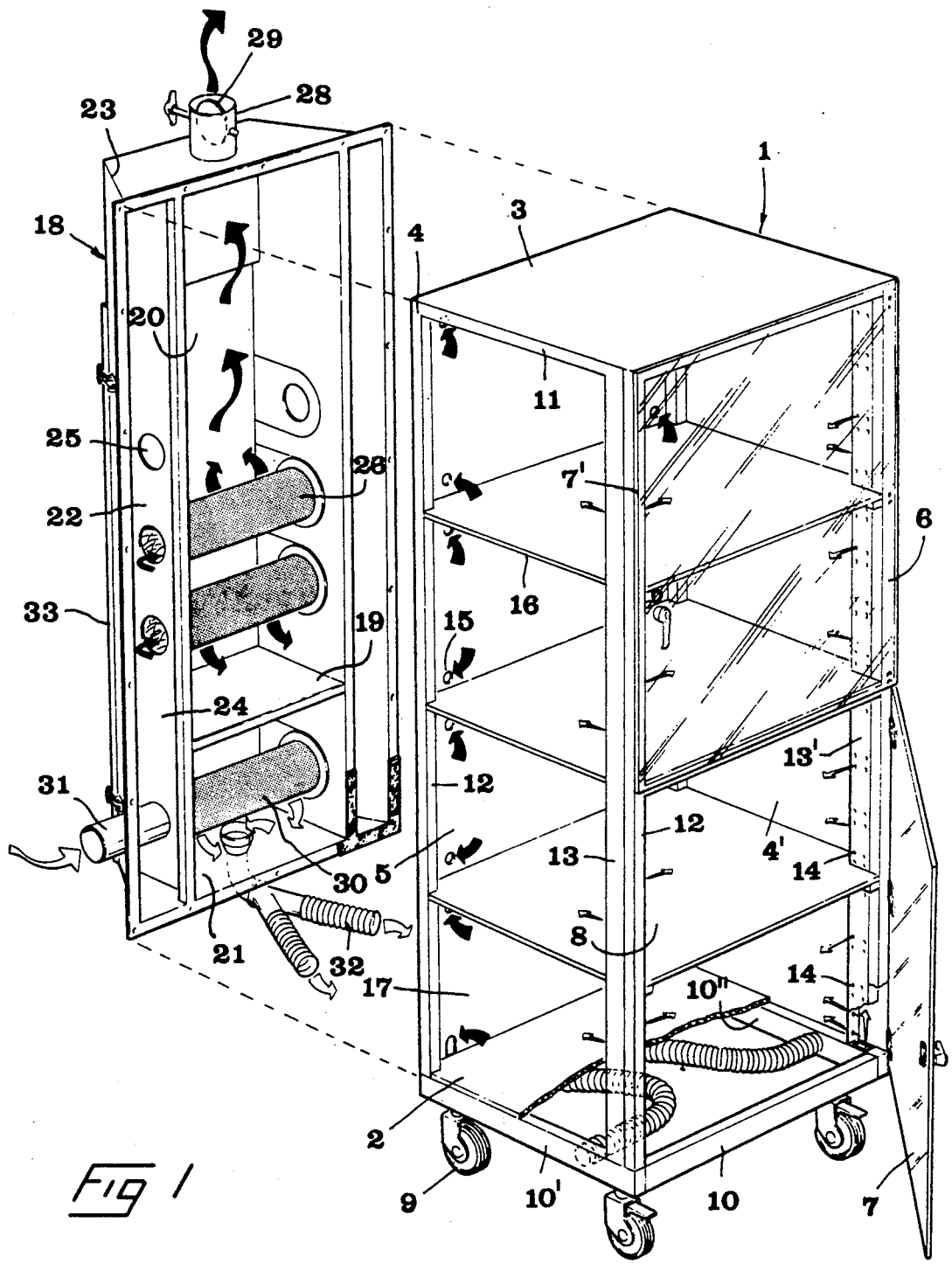
FIG. 1 is an exploded view of a first embodiment of the unit according to the invention, which here is a mobile unit.

FIG. 1 shows a housing 1 which comprises a bottom 2, a roof 3, two side walls 4, 4' (of which the former, for the sake of clarity, is shown without its associated metal sheet or covering panel), a rear wall 5, and a front wall 6 having an opening 8 which is closeable by means of two doors 7, 7' and which permits access to the interior of the housing. In actual practice, the housing 1 may advantageously be mounted on wheels 9 so that it is easy to move. Suitably, the housing consists of a framework covered with panels, e.g. thin metal sheets or transparent plastic panels, and made up of hollow sections, more precisely a bottom frame 10, a roof frame 11, and four corner posts or columns 12. Advantageously, the corner posts 12 are square sections. Two separate columns 13, 13', also in the form of hollow (rectangular) sections, are mounted just within the two corner posts defining the front opening 8. On at least one side, these sections 13, 13' have a large number of small holes 14 serving as nozzles for blowing supply air into the housing, the sections themselves serving as air ducts. As is apparent from FIG. 1 in combination with FIG. 3, the holes 14 are formed in the flanges of the sections 13, 13' which are opposing one other, such that the supply air passing through said holes will form opposing currents as shown by arrows A, A' in FIG. 3. At least the lower ends of the sections 13, 13' are open and communicate with the interior of the two sections 10', 10" forming part of the bottom frame 10, more precisely via openings in the upper flanges of these bottom sections.

It should be observed that the bottom 2, the roof 3, the side walls 4, 4', the rear wall 5 and the doors 7, 7' all are made of air-impermeable metal sheets or panels ensuring that the housing is substantially sealed to the ambient atmosphere when the doors are closed.

As is also apparent from FIG. 1, the rear wall 5 has a large number of holes 15 through which the exhaust air is evacuated from the housing. In the embodiment shown, a number of supporting means in the form of shelves 16 are mounted in the housing and divide the interior thereof into a number of separate compartments 17. As can be seen, each compartment 17 has a number of inlet holes 14 and a number of outlet holes 15. The outlet holes 15 are situated fairly close to the side walls of the housing or the rear corner posts 12. Since the outlet holes 15 are much larger than the inlet holes 14, the total throughflow area of the former holes is much larger, e.g. 3-5 times, than that of the latter in every compartment. Although it would be conceivable to close the opening 8 at the front of the housing with one door common to all of the compartments, it is preferred, in the embodiment shown, to have two doors 7, 7', one of which serves the two upper compartments, while the other serves the two lower compartments. In actual practice the doors 7, 7' may advantageously be made of acrylic plastic or some other equivalent transparent plastic.

In the embodiment shown in FIG. 1, a cover 18 is provided behind the rear wall 5 of the housing 1 and defines a gap which, in this case, is divided by a partition 19 into two part chambers 20, 21, of which the first communicates with vertical channels 22 which are delimited by inclined walls 23 of the cover 18 and vertical inner walls 24 extending in a direction substantially perpendicular to the plane of said cover. The first part chamber 20 and the two channels 22 communicate with one another via holes 25 in the inner walls 24. More precisely, the holes 25 are arranged in pairs and adapted to receive tubular filter means 26 of the type which, in a manner known per se, is open at its opposing ends. A line 28 with a damper 29 for regulating the volume of air through said line extends from the first part chamber 20. Thus, exhaust air from the different compartments in the housing 1 can be evacuated via the holes 15, the channels 22 and the holes 25, and conducted through the filter tubes 26 in a direction from the inside and out, more precisely out into the first part chamber 20 from which it is conducted through the line 28, e.g. out into the open.

A second tubular filter means 30 is provided in the second part chamber 21, said filter means having only one open end which can be connected with an inlet line 31 cutting through the channel 22 and serving to take in fresh air from the outside. The air from the line 31 is conducted through the filter means 30 in a direction from the inside and out, whereupon the filtered supply air entering the part chamber 21 is passed on to the sections 10', 10" of the bottom frame 10 via lines in the form of hoses 32, whereupon the supply air rises in the columns 13 to be supplied to the interior of the housing.

It should be observed that only one filter 30 is provided in the part chamber 21, namely between the inlet line 31 and the sections 13, 13', while no less than three filters 26 of the same size are provided in the part chamber 20, namely between the outlet holes 15 and the outlet line 28. This means that the total air throughflow capacity of the filters 26 is three times as great as that of the one filter 30.

The two part chambers 20, 21 are open in a rearward direction and are, in normal operation, closed by means of a removable door 33 which advantageously is common to both chambers. Thus, the filters 26, 30 can easily be removed and exchanged after the door 33 has been taken away. Also, the channels 22 are easily accessible via the holes 25 for flushing, e.g. with water.

In actual practice, a fan (not shown) may advantageously be incorporated into the part chamber 21 for actively blowing air through the lines 32, 10', 10", 13', 13" and the nozzle holes 14 into the interior of the housing. Furthermore, a vacuum source (not shown) may be connected with the part chamber 20 or the line 28, for actively sucking out the exhaust air from the interior of the housing. It is also conceivable to dispense with the blowing fan and only have one suction fan which sucks the air through the entire system from the inlet line 31 to the outlet line 28. It is also possible to connect, via branch lines, separate units in a series of several units to a central system of lines common to all of the units and having only one or a few suction fans.

Figure 2:
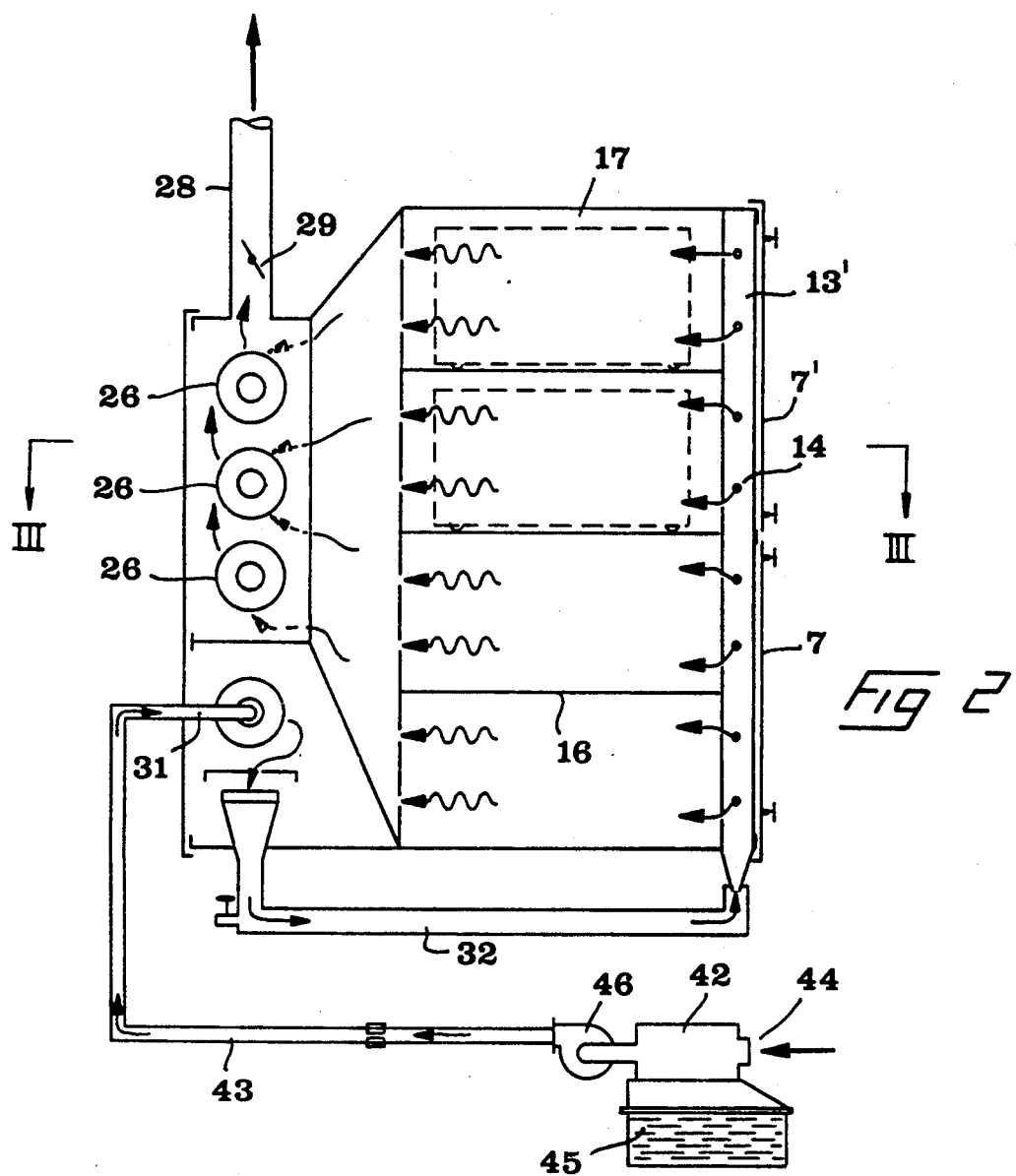
FIG. 2 is a simplified and schematic vertical section of a unit having essentially the same construction as in FIG. 1, said unit being shown together with an air humidifier.

In the following, reference is made to the schematic views in FIGS. 2 and 3. FIG. 2 illustrates how the unit according to the invention may be supplemented with an air humidifier 42 which, via a suitable line 43, can be connected with the inlet line 31 to said unit. Air, e.g. indoor air or outdoor air, is taken in via an inlet 44 and conducted through a water bath 45, whereupon it is conducted, by means of a fan 46, through the line 43 to the inlet 31 and further into the system described above. A device (not shown) maintaining the incoming air at the desired temperature may also be incorporated in the humidifier 42.

Figure 3:
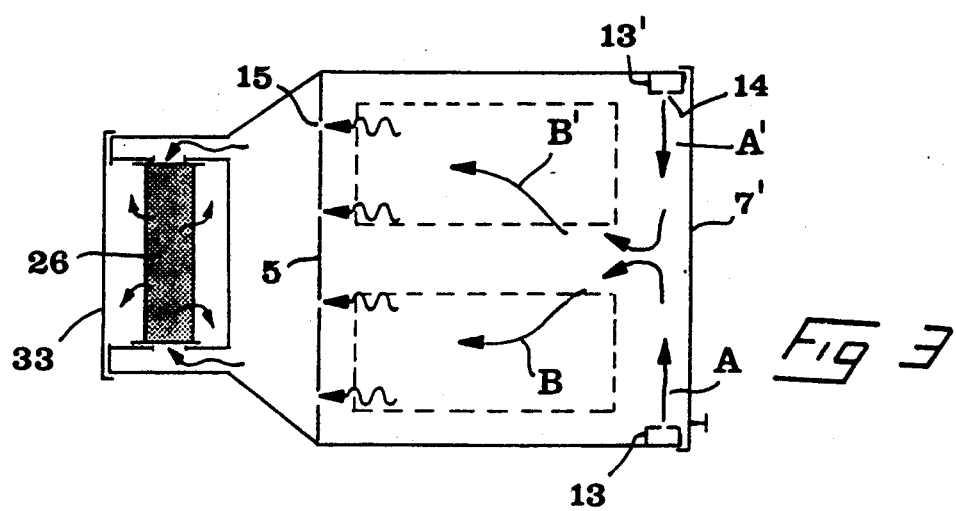
FIG. 3 is a horizontal section taker along the line III—III in FIG. 2.

As is apparent from FIG. 3, the air blown into the housing via the holes 14 in the sections 13, 13' serving as air ducts will, as mentioned earlier, be introduced in the form of opposing partial currents A, A' due to the position of the holes 14 in the opposing flanges or surfaces of the sections 13, 13'. The air currents A, A' meet somewhere half-way between the sections 13, 13' and are then deflected as currents B, B' which are conducted through the separate compartments to the outlet holes 15 in the rear wall 5. These horizontal partial currents directed away from the front wall and towards the rear wall can be kept discrete by suitable adjustment of the flow through said system. More precisely, the air flow through the different compartments when the doors 7, 7' are closed is determined by, on the one hand, the air throughflow capacity of the supply air filter 30 and, on the other hand, by the setting of the damper 29. When the doors are shut, the damper 29 is set to a position in which it is only partially open and in which it lets through a quantity of air much smaller than the total air throughflow capacity of the three exhaust air filters 26. Suitably, the damper is set in such manner that the air inside the housing is changed about 15-20 times per hour. When the doors 7, 7' are opened, e.g. for the taking of specimens or feeding, the damper 29 is reset, e.g. automatically, to a completely open position in which the total air throughflow capacity of the three exhaust air filters 26 is used to the full. This means that the suction effect inside the housing is increased considerably as compared with when the doors are shut, such that the air inside the housing is distinctly sucked out through the holes 15 in the rear wall 5 when the doors are opened. Thus, it is ensured that contaminated and possibly bacteriologically infected air stays within the unit when the doors are opened.

For the sake of clarity, it should be pointed out that different types of air currents flow through the separate compartments, depending on whether the doors are shut or open. When the doors are closed, air which in its entirety has passed through the ducts 13, 13' and the holes 14 flows through said compartments. However, when the doors are opened, substantially all air supply via the inlet holes 14 stops, and all supply air is instead taken in via the opening 8. In both cases, however, the air flows from the front towards the rear wall.

A further advantage of the unit shown in FIGS. 1-3 is that all equipment used for filtering and conducting the air, i.e. fans, filters and lines, can be located in a space on the rear side of the housing, which means that the housing itself can be used for storage all the way to the ceiling, at the same as the side walls require very little space, such that several housings may, in a simple manner, be arranged side by side to from whole batteries of air conditioning units which, for a given wall space, provide an optimum storage room.

In the following, reference is made FIGS. 4 and 5 which illustrate an alternative embodiment of the unit according to the invention. In this embodiment, the filter means for cleaning the air are provided in spaces adjacent to the roof of the housing instead of on the rear side thereof. Like the above embodiment, the unit in FIGS. 4 and 5 comprises a housing 1 with a roof 3, two side walls 4, 4', a rear wall 5, and a number of shelves 16. Adjacent to the front 6 of the housing, there are air ducts 13 which advantageously consist of hollow sections forming part of the housing frame although they may be designed in another manner, e.g. as shaped and bent portions of sheet metal forming the walls of said housing. Like in the embodiment shown above, the two air ducts 13 have a large number of small opposing holes 14 for introducing supply air into the interior of the housing, and the rear wall 5 has a large number of holes 15 for evacuating the exhaust air from said housing. Also in this case, a cover 18' provided on the rear side of the housing defines, together with the rear wall 5, a gap 34 which advantageously extends over the entire width and height of the housing. In this gap 34, which gathers the exhaust air passing through the outlet holes 15, there are, however, no filter means of the type shown in the embodiment in FIG. 1. Instead, the exhaust air is conducted from the gap 34 to a second cover 35 mounted on top of the roof 3 of the housing and containing a suitable number of filter tubes 26' which are mounted between partitions 36 located at a distance from the outer walls 37 of said cover 35. Between said partitions and the outer walls 37, ducts 38 are thus formed, which communicate with the gap 34 and through which the exhaust air can pass into the filter tubes via openings 39 in said partitions, so as to pass, after the filtering, out into a space 40 between the partitions 36 to be finally conducted out into the open air via the line 28'.

On the roof 3, two additional covers 41, 41' of a third type are provided which contain filter tubes 30' for filtering the supply air. The filter tubes 30' may either be of the simple type having an opening at one end, in case the cover 41, 41' has a single opening for this open end of the filter tube, or of the type having double openings, namely one at each end of the tube, in which case the cover is open at both its two opposite end walls. The supply air which is to pass through the filter tube 30' may advantageously be taken in directly from the room in which the housing 1 is located, although it is per se conceivable to take in the supply air via a specific line, e.g. a line from a separate air humidifier. From the interior of the cover 41, the air that has passed through the filter tube 30' is further conducted directly down into the associated air duct 13 to be sucked into the housing via the holes 15. It should be observed that the introduction of the supply air into the housing is in this embodiment carried out by suction, more precisely with the aid of the vacuum source (not shown) used for evacuating the exhaust air.

It should also be observed that the above alternative embodiment is only schematically shown in the drawing. Thus, the covers 35, 41 are in actual practice equipped with movable doors (not shown) permitting access to the interior of said covers for exchange of the filters therein.

Figure 4:
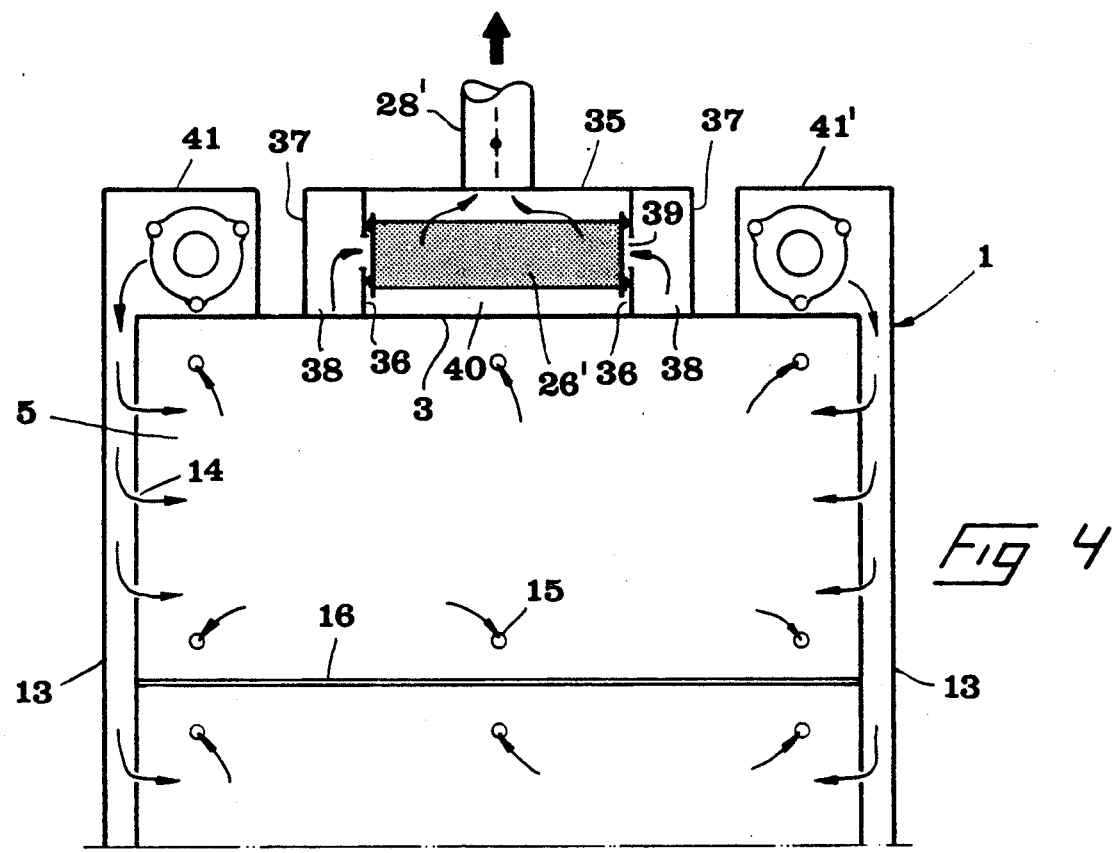
FIG. 4 is a partial, vertical section of the upper portion of an alternative embodiment of the unit according to the invention.
Figure 5:
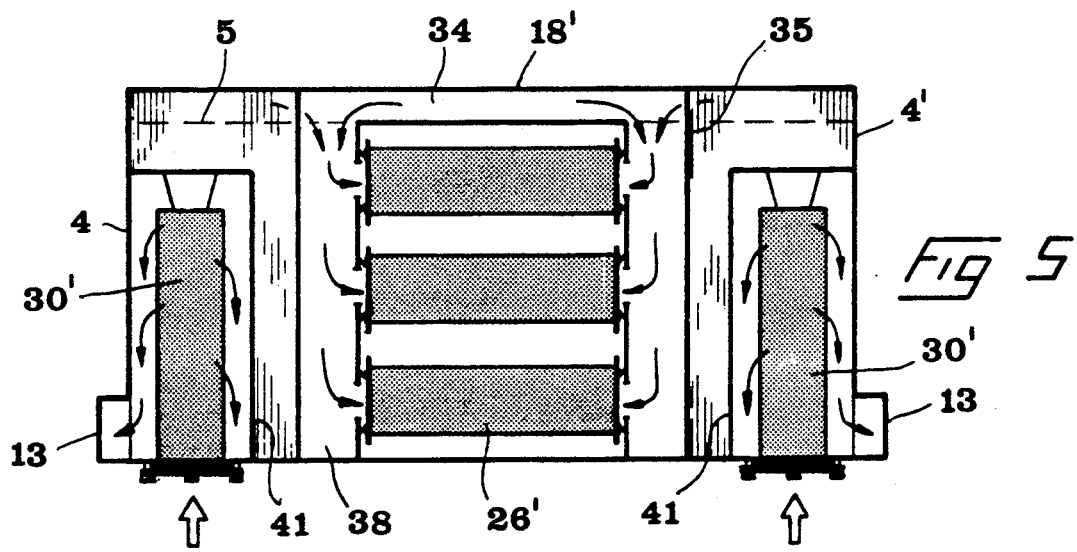
FIG. 5 is a horizontal cross-section of the upper portion of the unit in FIG. 4.

The unit shown in FIGS. 4 and 5 is particularly suited for use in such spaces where the ceiling height is no restrictive factor and it is desired to make maximum use of the floor surface.

Figure 6:
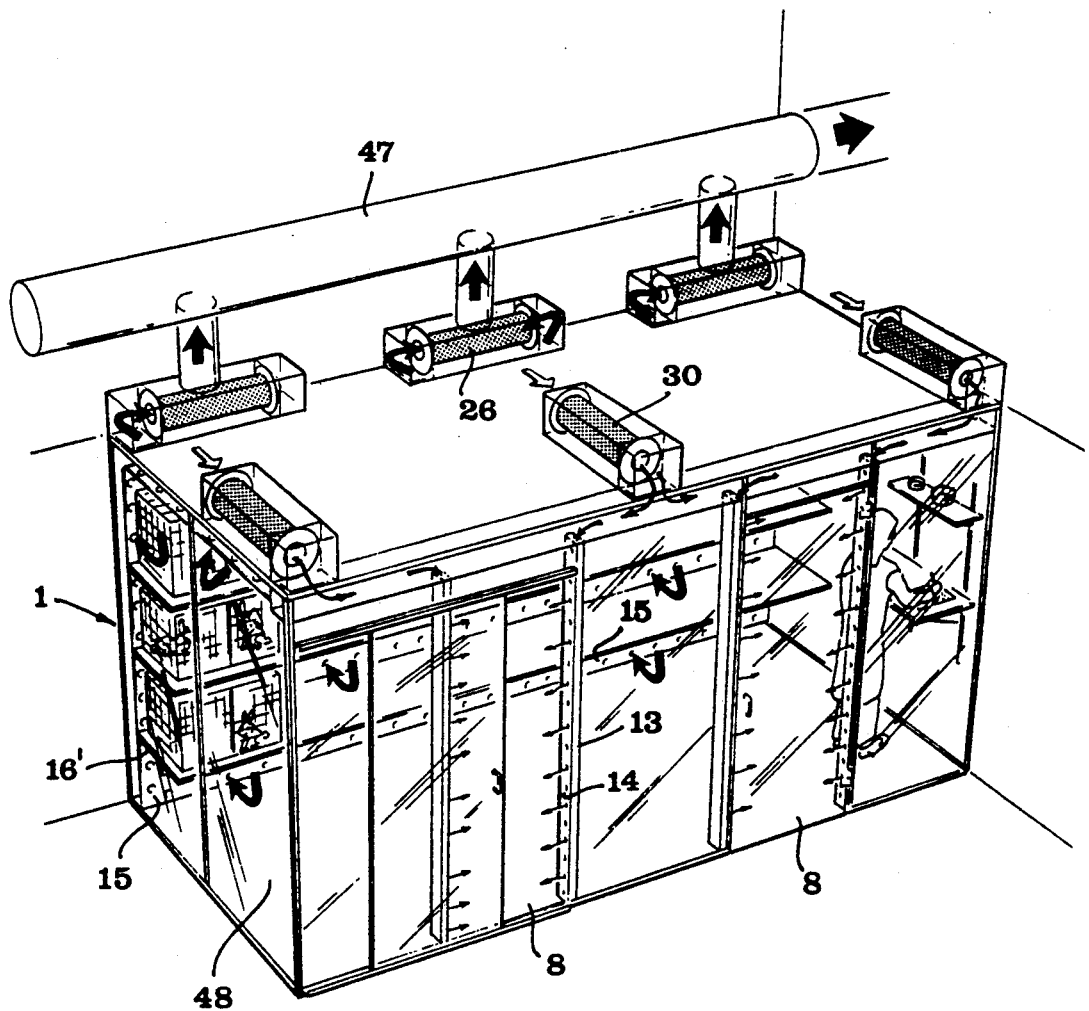
FIG. 6 is a perspective view of a stationary unit according to the invention.

FIG. 6, finally, illustrates a stationary unit according to the invention. Like the previously described embodiments, this unit comprises inlet holes 14 for supply air adjacent to each of the numerous access openings 8 in the housing 1, and a large number of outlet holes 15 for exhaust air are provided in the rear wall of said housing. Via filter tubes 30, the supply air is taken in from the room in which the housing 1 is located, and is conducted down into columns or sections 13 defining the openings 8 and formed with the inlet holes 14 previously described. The exhaust air is evacuated via filter tubes 26 connected to a common main line 47.

Unlike the embodiment in FIG. 1 in which the shelves 16 have the same depth as the housing, the unit in FIG. 6 has shelves 16' of a depth which is considerably less than that of the housing, i.e. the front edges of said shelves are situated at a distance within the front door of the housing. In this manner, there is formed in front of the shelves a free space 48 that can be used by the staff for taking specimens or feeding the animals. It is also obvious that the unit in FIG. 6, unlike the mobile unit in FIG. 1, is stationary, and its bottom and/or roof and at least one of the side walls may form part of the room where the unit is set up. Naturally, the stationary unit may also have shelves which take up the entire housing, i.e. have the same depth as said housing.

POSSIBLE MODIFICATIONS OF THE INVENTION

It goes without saying that the invention may be modified in various ways within the scope of the appended claims. Although the inlet holes 14 in the embodiment shown in FIG. 1 are provided in specific hollow sections 13 arranged just within the actual corner posts 12 of the framework of the housing, it is also conceivable to bore said holes directly in said corner posts and dispense with the specific hollow sections 13. Although it is preferred, as shown in the drawings, that the filter means for filtering the supply air and/or exhaust air of said unit are provided adjacent to the housing, it is naturally possible to have these filter means at a distance from said unit and conduct the air currents to and from the housing via specific lines, e.g. branch lines to a line system with central filtering functions. Despite the outlet holes 15 being shown in the rear wall 5 of the housing, they may naturally be arranged in the rear corner posts of the housing or in other air evacuation ducts adjacent to the rear wall of said housing. Furthermore, it should be pointed out that it is possible, if the unit is very wide, to position, as shown in FIG. 6, at least one post or hollow section in the area between, e.g. half-way between, the two corner posts or hollow sections 13, 13'. Also this centre post, which may separate two adjacent doors from one another, can serve as air duct and have inlet holes of the same type as the holes 14, more precisely on its opposite sides, so as to direct, in the manner described, discrete and horizontal air currents against the air currents from the corner posts 13, 13'. Centre posts of this type can be used for mounting vertical partitions dividing the separate compartments into two or more spaced-apart parts. It should furthermore be noted that the supporting means separating the compartments in the housing need not be air-impermeable shelves or plates but may, for instance, be gratings or screens. To have two doors, one upper and one lower, at each opening in the housing is preferred because a comparatively small door gives, when opened, a better draught in the area of the opening than a single comparatively large door. For this reason, there may also be one door for each compartment.

I claim:

1. An air conditioning unit for experimental animals, comprising a housing with a bottom, a roof, two side walls, a rear wall, and a front wall having an opening provided with at least one door and which permits access to the interior of said housing; one or more supporting means, forming two or more compartments each adapted to accommodate a number of cages with experimental animals; and means for conducting air through said compartments in horizontal air currents which are taken into the housing in the form of supply air via inlet holes and which are sucked out in the form of exhaust air via outlet holes in an opposing wall, characterized in that the inlet holes are formed in two vertical air ducts which both are disposed immediately adjacent to the opening in the housing and which have opposing surfaces in which said inlet holes are formed defining means for conducting the supply air into the housing in the form of opposing partial currents which, after having met in an area between the air ducts, are deflected towards the housing rear wall which has the outlet holes for sucking out the exhaust air, such that the air currents passing through the separate compartments are at all times directed away from the front wall and towards the rear wall, whether the door is closed or not.

2. Unit as claimed in claim 1, characterised in that at least one filter for cleaning the supply air before this is introduced into the housing, is provided between an inlet for the supply air and said vertical air ducts, and that one or more filters with a total air throughflow capacity higher than that of the supply air filter are provided between the outlet holes in the rear wall and an outlet for final evacuation of the exhaust air from said unit, so as to produce, when the door is opened, an increased air flow through the interior of the housing, compared with the air flowing through when said door is shut.

3. Unit as claimed in claim 2, characterised in that the housing consists of a panel-covered framework of hollow sections, comprising a bottom frame, a roof frame, and four corner posts, of which the two posts associated with the front wall are identical with the air ducts having the inlet holes.

4. Unit as claimed in claim 2, characterised in that the housing consists of a panel-covered framework of hollow sections, comprising a bottom frame, a roof frame, and four corner posts, of which the two posts associated with the front wall are connected with said ducts.

5. Unit as claimed in claim 2, characterised in that there is provided, behind the rear wall of the housing, a cover defining a gap in which said outlet holes open.

6. Unit as claimed in claim 5, characterised in that the gap is divided by a partition into two part chambers, the first part chamber communicating with vertical channels in which the outlet holes in the rear wall end and containing one or more exchangeable tubular filter means through which exhaust air from the channels pass in a direction from the inside and out into the first part chamber, and the second part chamber communicating with at least on hollow section which forms part of the bottom frame of the housing and is connected with the air ducts, said second part chamber containing at least one second tubular filter means through which a supply air current taken in a via a line is intended to flow in a direction from the inside and out.

7. Unit as claimed in claim 5, characterised in that the gap on the rear side of the housing communicates with a second cover provided in the area of the roof of the housing and containing one or more exchangeable tubular filter means through which the exhaust air passes before being finally evacuated from said unit.

8. Unit as claimed in claim 7, characterised in that at least one third cover provided in the area of the roof of the housing contains at least one filter means for cleaning supply air from the outside and communicates with an air duct at the front of the housing.

* * * * *